United States Patent
Maresh

(10) Patent No.: US 10,280,604 B1
(45) Date of Patent: May 7, 2019

(54) TOILET HAVING A WATER CONSERVATION PERISTALTIC PUMP MODE

(71) Applicant: Joseph D Maresh, West Linn, OR (US)

(72) Inventor: Joseph D Maresh, West Linn, OR (US)

( * ) Notice: Subject to any disclaimer, the term of this patent is extended or adjusted under 35 U.S.C. 154(b) by 0 days.

(21) Appl. No.: 15/347,779

(22) Filed: Nov. 9, 2016

Related U.S. Application Data

(60) Provisional application No. 62/285,819, filed on Nov. 9, 2015.

(51) Int. Cl.

| | |
|---|---|
| *E03D 1/14* | (2006.01) |
| *E03D 3/12* | (2006.01) |
| *E03D 5/01* | (2006.01) |
| *E03D 5/092* | (2006.01) |
| *E03D 1/30* | (2006.01) |
| *E03D 9/10* | (2006.01) |

(52) U.S. Cl.
CPC .............. *E03D 5/01* (2013.01); *E03D 1/30* (2013.01); *E03D 5/092* (2013.01); *E03D 9/10* (2013.01)

(58) Field of Classification Search
CPC .. E03D 5/01; E03D 5/00; E03D 5/092; E03D 1/30; E03D 9/10; E03D 1/14; E03D 1/144
USPC ............ 4/324, 325, 326, 327, 431, 432, 433
See application file for complete search history.

(56) References Cited

U.S. PATENT DOCUMENTS

| | | | | |
|---|---|---|---|---|
| 3,585,650 A | * | 6/1971 | Lekberg et al. | E03D 5/016 4/317 |
| 3,699,592 A | * | 10/1972 | Minchak | E03D 9/10 210/173 |
| 4,003,097 A | * | 1/1977 | Book | E03D 1/145 137/636.2 |
| 4,485,501 A | * | 12/1984 | Kloner | E03D 1/144 4/249 |
| 5,187,818 A | * | 2/1993 | Barrett, Sr. | E03D 5/105 4/304 |
| 5,301,373 A | * | 4/1994 | Hull | E03D 1/306 4/325 |
| 7,028,347 B2 | * | 4/2006 | Sanderson | E03D 1/00 4/313 |
| 7,168,109 B1 | * | 1/2007 | Reid | E03D 9/12 4/661 |
| 2004/0064881 A1 | * | 4/2004 | Breiing | E03F 1/006 4/431 |
| 2005/0283896 A1 | * | 12/2005 | Huang | E03D 1/35 4/404 |
| 2009/0000019 A1 | * | 1/2009 | Tolles | E03F 1/006 4/431 |
| 2010/0107324 A1 | * | 5/2010 | Hein | E03D 1/144 4/325 |
| 2011/0035869 A1 | * | 2/2011 | Vladislav | E03D 5/01 4/431 |
| 2014/0026309 A1 | * | 1/2014 | Le | E03D 1/304 4/325 |
| 2014/0109306 A1 | * | 4/2014 | Chuan | E03D 5/10 4/325 |

* cited by examiner

*Primary Examiner* — Benjamin R Shaw
(74) *Attorney, Agent, or Firm* — Nick A Nichols, Jr.

(57) ABSTRACT

In a tri-flush toilet, three operational flush modes may be provided to enable water conservation. The toilet may include a third mode operating a peristaltic pump to reduce the water consumption per flush. The peristaltic pump is operably connected to evacuate fluids and/or solids form the toilet bowl.

8 Claims, 6 Drawing Sheets

TOILET HAVING A WATER CONSERVATION PERISTALTIC PUMP MODE

CROSS-REFERENCE TO RELATED APPLICATION

This application claims the benefit of U.S. Provisional Application Ser. No. 62/285,819, filed Nov. 9, 2016, which application is incorporated herein in its entirety by reference.

BACKGROUND

The present invention relates a water saving toilet, particularly to a toilet having water conservation peristaltic pump mode.

Toilets are well known in the art, and improvements involving water use efficiency continue because typically 20-30% of residential water use may be attributed to toilet flushing activity. For example, one study concluded that indoor water use typically breaks down to 28% for toilets, 22% for washing machines, 19% for showers and baths, 16% for sinks, and 14% for plumbing household leaks.

Originally the siphon-flush toilet as invented by Joseph Adamson utilized up to seven gallons of water per flush. In the 1990's, conservation laws mandated that "low flow" toilets use a maximum of 1.6 gallons per flush (GPF). To accomplish the greater efficiency, wider flapper valves (at the hole at the bottom center of the tank where fresh water flows down into the bowl), and wider trapways (the passageway connecting the bottom of the toilet bowl to the main sewer line) were developed. Glazing and finishing to reduce trapway friction is another ongoing design evolution, which includes the use of nanotechnology. Recently, further performance tiers have been established, including a 1.28 GPF "WaterSense'" EPA government standard.

Dual-flush (two stage) toilets are available, where for example, a first flush button may operate to flush liquid waste utilizing about 0.80 gallons per flush (GPF), and a second flush button may operate to flush solid waste utilizing about 1.6 gallons per flush (GPF). Typically, most 1.6 GPF toilets are gravity-assist only, and do not use the siphonic action of traditional toilets in which waste is pulled out of the bowl with the water. Toilet trapways for dual-flush toilets are typically four inches in diameter, which is an increase in diameter of one or two inches over prior art toilets. Dual-flush toilets reportedly are estimated to save up to 68 percent more water than conventional (1.6 GPF) low flow toilets, however such studies do not factor in actual usage situations where dual-flush toilets may not always get rid of all the waste, and multiple flushing may be required to completely remove all liquid and/or solid waste.

SUMMARY

In a tri-flush toilet, three operational flush modes may be provided to enable water conservation. The toilet may include a third mode operating a peristaltic pump to reduce the water consumption per flush. The peristaltic pump is operably connected to evacuate fluids and/or solids form the toilet bowl.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION

Figure 1:
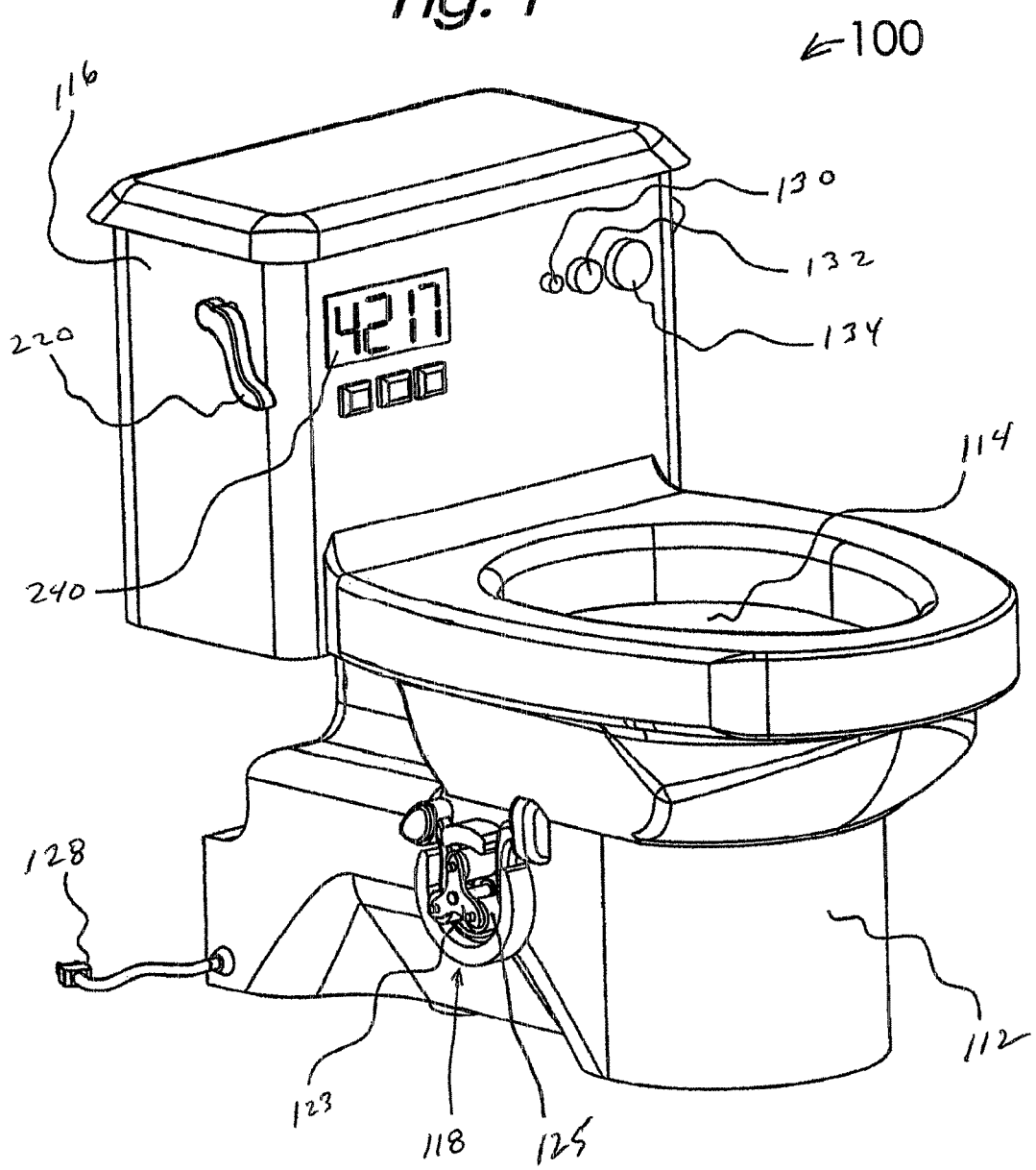
FIG. 1 is perspective view of a tri-flush toilet.

Referring first to FIG. 1, a tri-flush toilet is generally identified by the reference numeral 100. The toilet 100 may include a base 112, a bowl 114, a tank 116 affixed to the base 112 or integral therewith. The tank 116 may include a fill valve, float control, main tank flapper valve, actuation levers, switches, and associated hardware common to flush type toilets. The toilet 100 may be connected to a pressurized water supply source in a known manner.

The toilet 100 may include three flush modes. Toilets having two flush modes are known in the art and are generally referred to as toilets with "dual flush" capability. The toilet 100 may include a third flush mode generally involving pump means for evacuating the bowl 114, followed by filling the bowl 114 to a vapor locked water level. Evacuation of the bowl 114 may be performed by actuation of a peristaltic pump 118 mounted to the base 112 of the toilet 100. The base 112 may include appropriate support structure for fixedly securing the peristaltic pump 118 to the base 112. Alternatively, the pump 118 may be secured remotely from the toilet 100.

A peristaltic pump is a positive displacement pump used for pumping a variety of fluid, such as, but without limitation, gas, liquid, and liquid mixed with solids. The pump 118 may contain fluid and/or fluid/solids mixture within a flexible tube 119 fitted inside a circular pump casing 121. A rotor 123 may include rollers 125 and the like mounted thereon, that upon rotation of the rotor 123 compress the flexible tube 119. Compression of the flexible tube 119 forces fluid to move through the flexible tube 119. As the flexible tube 119 opens to its natural state after the rollers 125 pass, fluid flow is induced to the pump 118. Fluid trapped between rollers 125 is moved toward the pump outlet 127.

Figure 2:
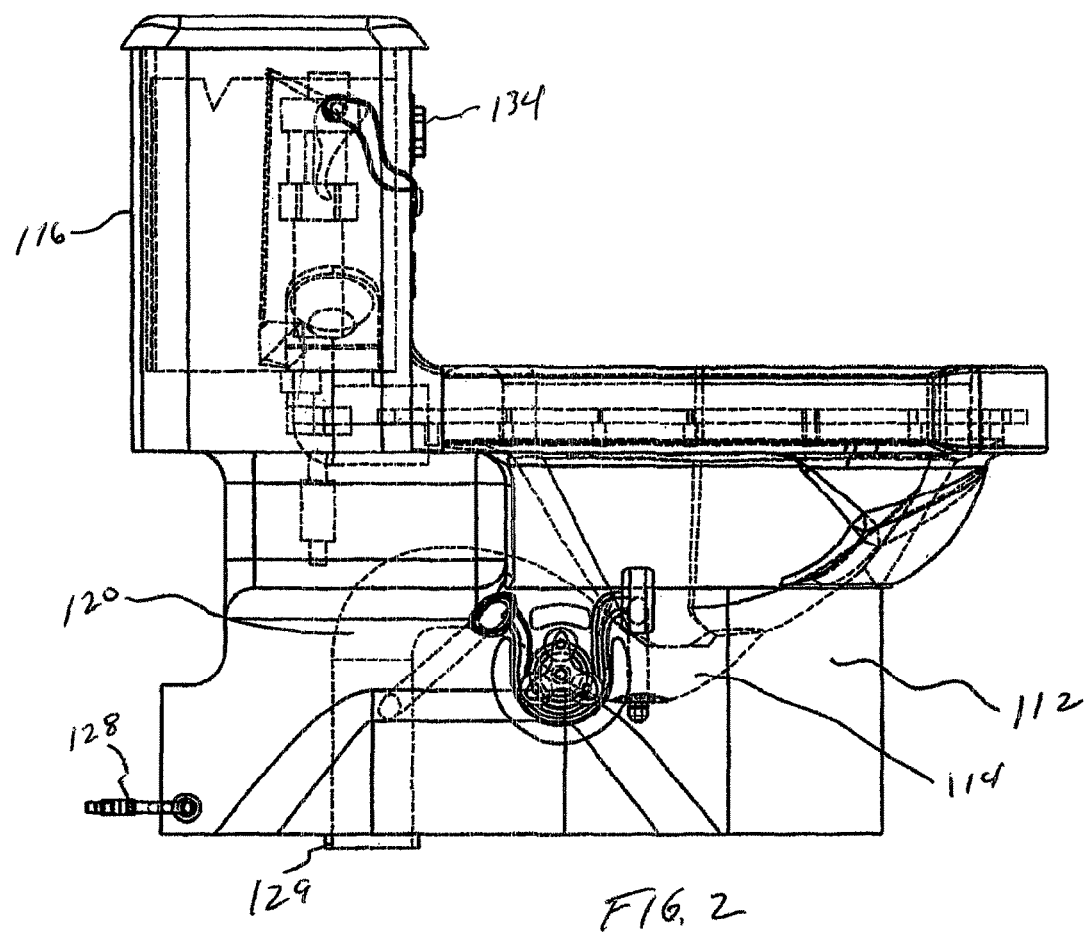
FIG. 2 is a side view of the tri-flush toilet shown in FIG. 1 with hidden lines shown.
Figure 3:
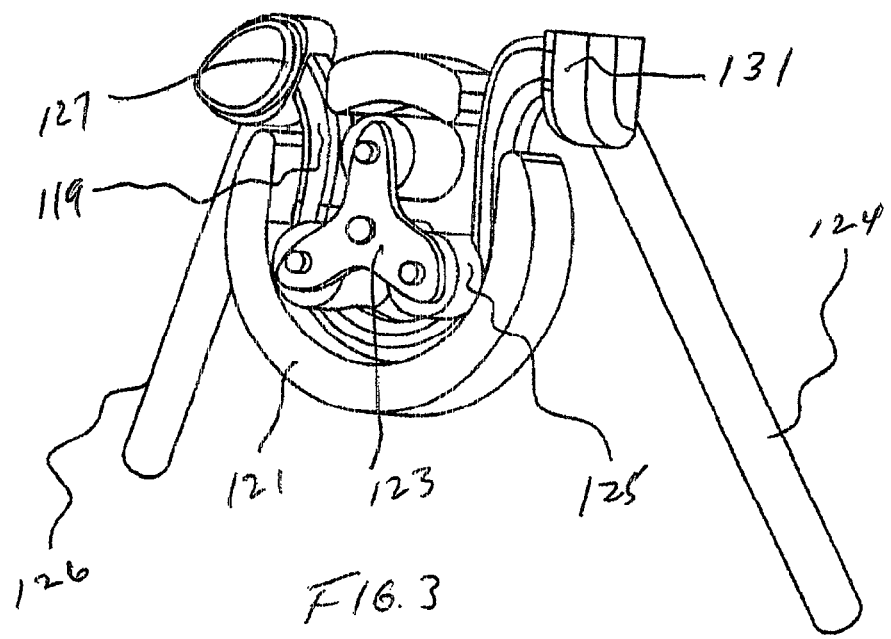
FIG. 3 is a partial perspective view of a peristaltic pump of the tri-flush toilet shown in FIG. 1.

Referring now to FIG. 2, the bowl 114 of the toilet 100 may include a toilet trapway 120 of a generally inverted U-shape typical of known toilet designs. The outlet leg of the trapway 120 may open into a sewer drain and connected in sealing relationship therewith by a wax seal ring 129 and the like.

The bowl 114 may include a drain hole 122 that is generally at the lowest elevation of the bowl 114 to ensure complete evacuation of the bowl 114. The drain hole 122 opens into a bowl drain tube 124. The drain tube 124 may include an open end in fixed sealing engagement with the bowl 144 circumscribing the drain hole 122. An opposite end of the drain tube 124 is connected to the pump inlet 131 of the peristaltic pump 118. A pump outlet tube 126 may be connected to the pump outlet 127 of the peristaltic pump 118. The opposite end of the pump outlet tube 126 is connected to the sewer drain. Seal means may be provided between the base 112 and the pump inlet and pump outlet tubes 124 and 126, respectively, to ensure sanitary conditions and seal potential leakage points. The pump 118 may be electrically connected to a low voltage electrical power source by an electrical cord 128.

In operation, the toilet 100 may operate similar to dual mode toilets with the exception that the toilet 100 includes a third mode of operation. Dual mode toilets typically flush two predetermined bowl flush volumes using adjustable floats and/or electrical contacts and/or sensors and the like to set the amount of water which is cycled into the toilet bowl during flushing. The toilet 100 may operate with three predetermined bowl fill and/or bowl flush volumes.

Draining or pumping out the bowl 114 is generally considered a temporary condition due to the potential for sewer gases to migrate into the room interior while the bowl vapor lock is lost, and subsequent refilling of the bowl 114 re-establishes the vapor lock. As indicated above, fresh water tank 116 outlet valves typically use adjustable floats and/or electrical contacts and/or sensors and the like to set the amount of water which is cycled into the toilet bowl 114 during flushing. In a similar manner, a three stage tank outlet valve may be employed which discharges fresh water into the bowl 114 at volumes of 0.4, 0.8, and 1.6 GPF corresponding to the fresh water tank dump buttons 130, 132, and 134, respectively.

Figure 4:
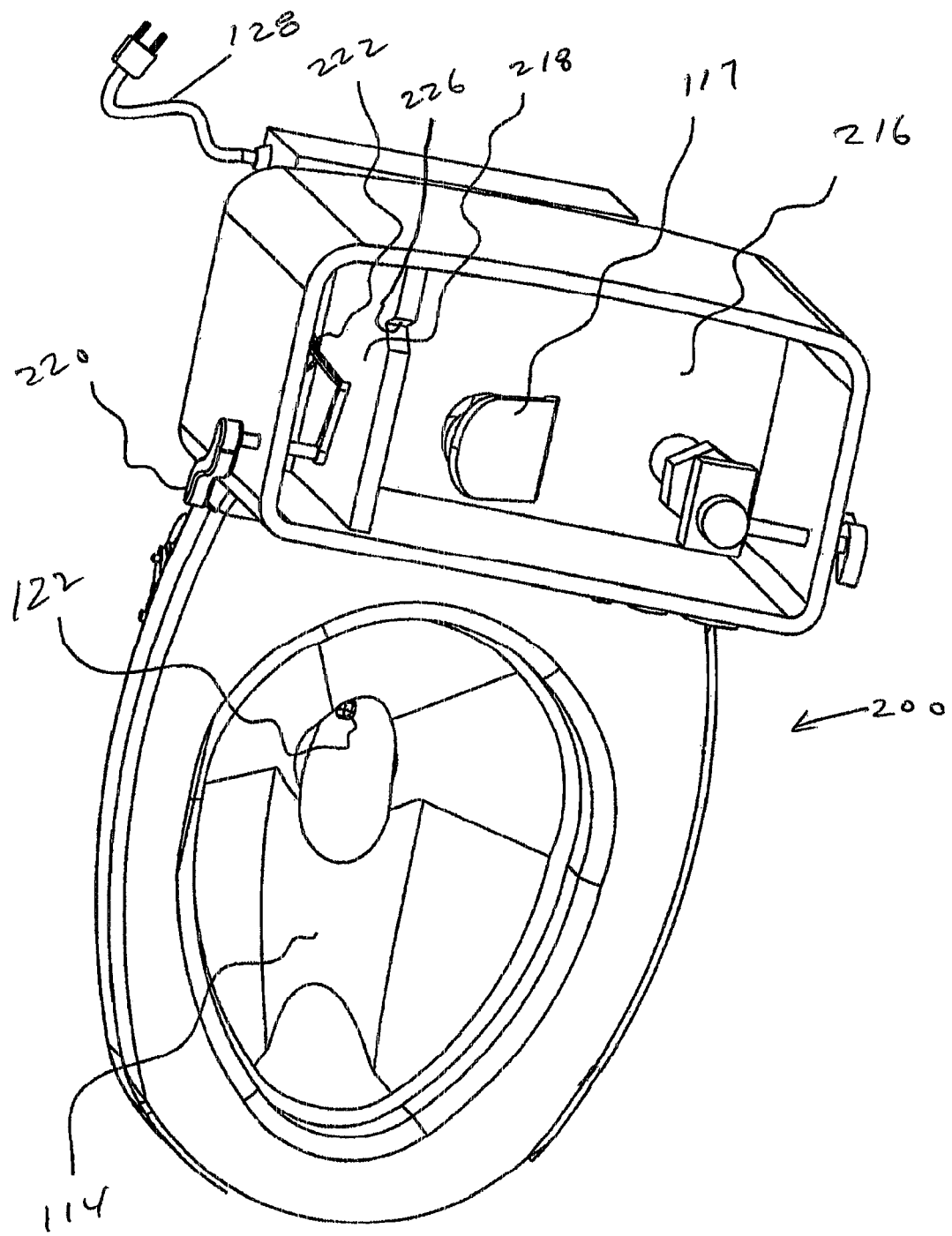
FIG. 4 is a partial top perspective view of a second embodiment of a tri-flush toilet.
Figure 5:
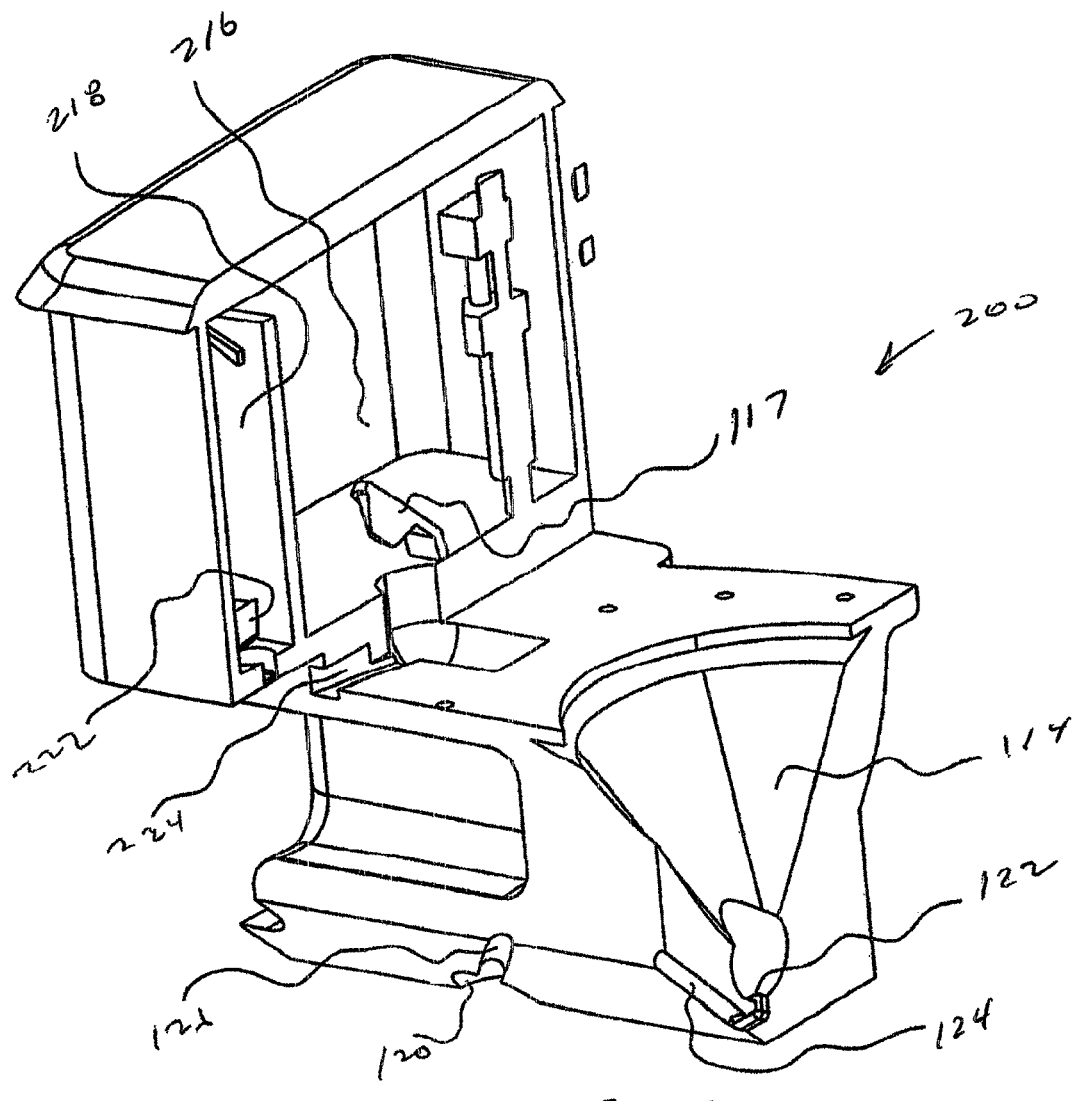
FIG. 5 is another partial perspective view of the tri-flush toilet shown in FIG. 4.

Referring now to FIGS. 4 and 5, a second embodiment of a tri-flush toilet is generally identified by the reference numeral 200. As evidenced by use of common reference numerals, the toilet 200 is similar to the toilet 100 described above with the exception that the toilet 200 may include a main tank reservoir 216 generally operating as a dual mode (mode two and mode three flushes) toilet and a dedicated reservoir 218 operable independently as a "mode one only" flush. Generally, the mode one hardware may include at least the reservoir 218, an independent mode one actuation lever 220, an independent mode one flapper 222, and an independent mode one fresh water passageway 224 which routes the limited capacity (0.4 gallons—for example) of the dedicated bowl fill reservoir 218 to the bowl 114 without effecting any discharge of the main reservoir 216 into the toilet bowl 114. Independent means to fill the dedicated mode one reservoir 218 are not required because the main tank 216 normal fill level may be designed to spill over into the dedicated reservoir 218, for example, but without limitation, through a notch 226 on a wall of the reservoir 218, at any time the reservoir 218 water level drops below the steady state main tank reservoir 216 normal fill level. Essentially, during mode one operation a user may simply push the mode one handle 220 which opens the mode one flapper 222 to empty dedicated mode one reservoir 218 and fill the bowl 114 at any time during toilet usage. It may be noted that if simultaneous emptying of reservoirs 216 and 218 are allowed with the design (assuming there are no interlocking devices to prevent such action), then up to 2.0 gallons of water may be delivered to the bowl 114 (mode one at 0.4 gallons plus mode three at 1.6 gallons equals 2.0 gallons).

Figure 6A:
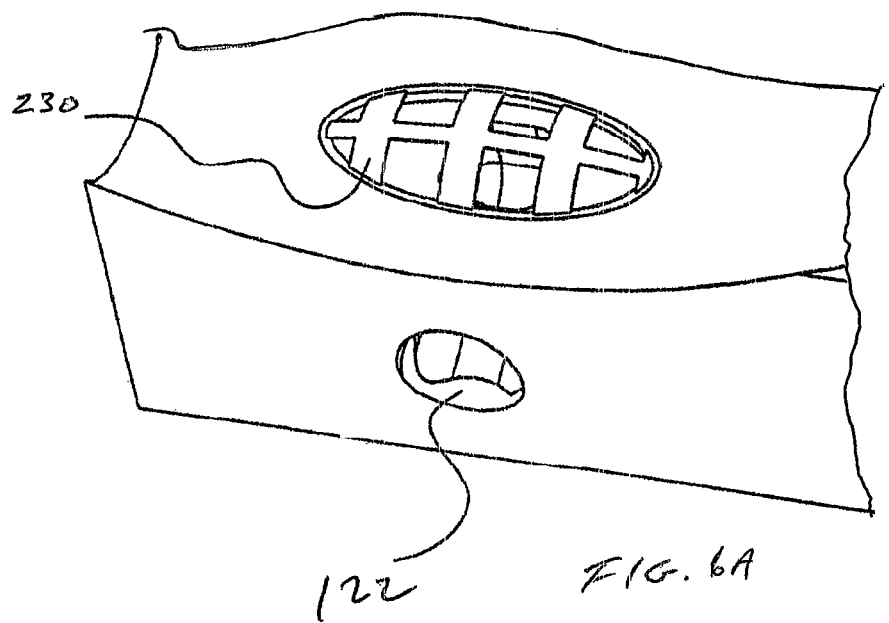
FIGS. 6A and 6B are partial perspective view of a screen and an impeller, respectively, included in a tri-flush toilet.
Figure 6B:
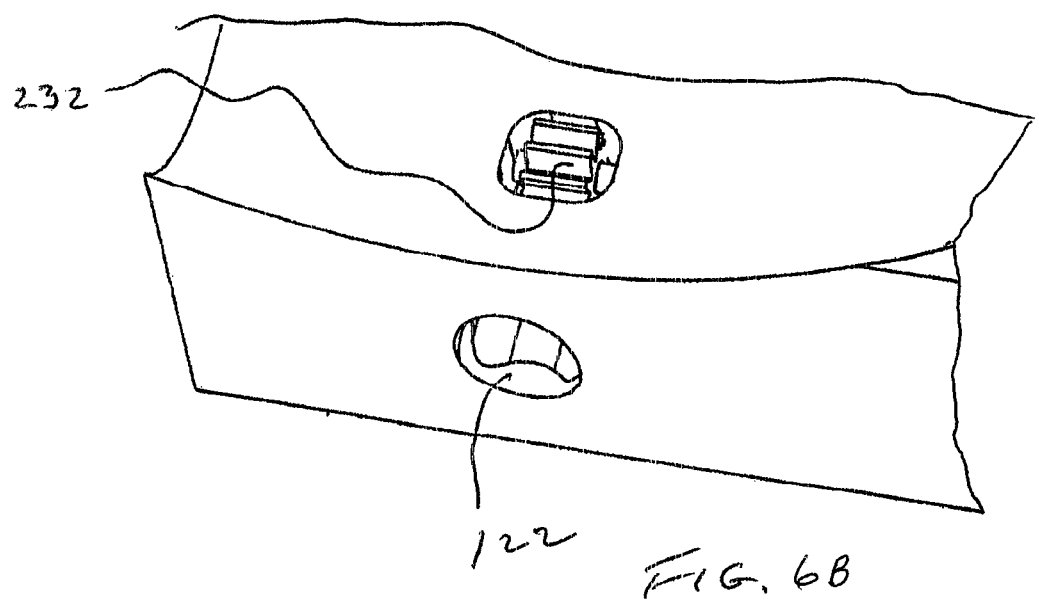

Referring now to FIGS. 6A and 6B, the drain hole 122 may optionally be covered by a screen 230 and/or a grinding or macerating impeller 232 may be installed within a void of the drain hole 122, where for example the macerating impeller 232 may include vanes which cause the impeller 232 to rotate as flow occurs toward the pump 118. If screen 230 and/or macerating impeller 232 are not employed, it may be advisable to install the tri-flush toilet downstream of appliances such as washing machines and dishwashers to ensure adequate volumes of water (or gray water) passes through the local sewer pipes to ensure that all solids from the tri-flush toilet are carried toward a septic system or street main sewer line. Furthermore, although a relatively small drain 122 diameter (0.50 inch ID) is illustrated in conjunction with an electrically powered peristaltic pump 118, it will be appreciated that because peristaltic pumps typically operate at relatively slow revolutions per minute (200 rpm for example), a manual pump version may alternatively be employed where an unillustrated pump hand crank may be provided and where the drain diameter is three inches (and pump tube diameter is three inches), for example. In this instance, the user only needs to hand crank the pump 118 for one crank revolution in order to evacuate the toilet bowl completely, and where electrical power is not required. As in the above example where with a given tube inside diameter of three inches (d=3 and with a radius of curvature of the tube route within the pump housing of approximately eight inches (r=8"), and assuming 180 degrees of pump roller to tube compression, the volume of waste pumped equals approximately 0.8 GPF which is more than sufficient to evacuate most toilet bowls.

Additionally, for household units that may be electrically powered, and where toilet water usage is to be monitored, a digital display 240 may be installed where upon pushing a button or actuating a lever corresponding to any of the three flush modes of operation, the digital cumulative display may advance by 0.4 gallons, 0.8 gallons, or 1.6 gallons, respectively.

The embodiments illustrated herein are manual versions, it will be appreciated however that fully automatic embodiments are possible where upon actuation the peristaltic pump turns on to evacuate the toilet bowl, followed by automatically turning the pump off and subsequently automatically filling the bowl with fresh water to the appropriate bowl fill water level to ensure a proper vapor lock.

While preferred embodiments of the invention have been shown and described, other and further embodiments of the invention may be devised without departing from the basic scope thereof, and the scope thereof is determined by the claims which follow.

The invention claimed is:

1. A toilet operatively connected to a sewer drain and a pressurized water source, comprising;
   a) a water tank, said water tank including a first tank reservoir and a second tank reservoir, said first tank reservoir operable independent of said second tank reservoir;
   b) said water tank including three flush modes of operation, and wherein said water tank further includes a plurality of tank dump buttons operable for selectively releasing a predetermined volume of water from said water tank;
   c) a bowl operatively connected to said water tank;
   d) said bowl including a drain hole; and
   e) a peristaltic pump operatively connected to said drain hole for evacuating said bowl.

2. The toilet of claim 1 wherein actuation of said tank dump buttons releases a respective 0.4 gallons per flush (GPF), 0.8 GLF and 1.6 GPF of water into said bowl.

3. The toilet of claim 1 wherein simultaneous emptying of said first tank reservoir and said second tank reservoir releases up to 2.0 GPF of water into said bowl.

4. The toilet of claim 1 including a screen covering said drain hole.

5. The toilet of claim 1 including a macerating impeller secured proximate said drain hole.

6. The toilet of claim 1 wherein water overflow from said first tank reservoir fills said second tank reservoir.

7. The toilet of claim 1 including an actuation lever independently operable to release water from said second tank reservoir into said bowl.

8. The toilet of claim 7 wherein said second tank reservoir includes a valve operable for releasing water from said second tank reservoir through a water passageway into said bowl without discharging water from said first tank reservoir.

\* \* \* \* \*